Patented Apr. 17, 1951

2,549,457

UNITED STATES PATENT OFFICE 2,549,457

PREPARATION OF ALPHA-METHYLACROLEIN

William F. Gresham, Wilmington, Del., assignor to E. I. du Pont de Nemours & Company, Wilmington, Del., a corporation of Delaware No Drawing. Application August 4, 1948, Serial No. 42,548

3 Claims. (Cl. 260—601)

This invention relates to a process for the preparation of alpha-methylacrolein, and more particularly to its preparation by the reaction of propionaldehyde with formaldehyde in the presence of aqueous boron fluoride as a catalyst for the reaction.

The unsaturated aldehydes, and more particularly alpha-methylacrolein, have the relatively high reactive power of aldehydes and, because of the unsaturated C=C linkage, have also the power of addition reactions similar to those shown by the olefins. An inexpensive process, accordingly, for the preparation of the versatile aldehyde, alpha-methylacrolein, would be a decided advance in the arts.

An object of the present invention is to provide an inexpensive and highly efficient process for the preparation of alpha-methylacrolein. Another object is to provide a process for the preparation of this unsaturated aldehyde by the condensation of propionaldehyde with formaldehyde in the presence of a hydrated boron fluoride catalyst. Yet another object is to provide preferred conditions for the reaction. Other objects and advantages of the invention will hereinafter appear.

Alpha-methylacrolein is prepared in accord with the process of this invention by the condensation of propionaldehyde with formaldehyde in the presence of water and boron trifluoride as the catalyst. A solution of formaldehyde and the catalyst in water is first prepared and into this solution is gradually introduced with stirring and over a period of time propionaldehyde alone or admixed with formaldehyde, the methylacrolein being removed as rapidly as formed. When the process is conducted in this manner, exceptionally high yields of the unsaturated aldehyde are realized, the unconverted reactants being readily recovered for reuse.

In accord with stoichiometric requirements, one mol of propionaldehyde reacts per mol of formaldehyde in accord with this equation:

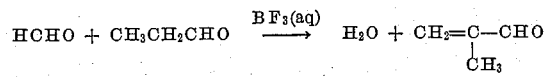

It has been found, however, that the reaction proceeds more favorably if there is an excess of the formaldehyde present and preferably at least a 25% molar excess of formaldehyde over the propionaldehyde. The reaction is conducted at temperatures ranging between 65° C., about the boiling point of the alpha methyl acrolein-water azeotrope, and 150° C. with a preferred range between 90° and 125° C. Pressures above atmospheric may be used, if desired.

The catalyst employed for this reaction and which is inter alia responsible for the exceptional yields of alpha-methylacrolein is a hydrated form of boron trifluoride or simply a mixture of boron trifluoride in water. The catalyst may be made, for example, by the process described in the McAlevy Patent 2,135,454. The ratio of water to boron fluoride in the catalyst is not particularly critical since additional water may be present in the reaction mixture. However, it has been found convenient to employ a catalyst in which the molar ratio of water to BF$_3$ is between 3.5 to 1 and 2:1.

When operating the process by passing propionaldehyde with or without formaldehyde into an aqueous solution of formaldehyde and catalyst, the solution may contain on a weight basis from about 10 to 40% formaldehyde and from about 2 to 15% boron trifluoride. The propionaldehyde added to the aqueous formaldehyde-catalyst solution may be concentrated or may contain up to about 25% by weight of formaldehyde or up to about 40% water.

The examples which follow illustrate preferred embodiments of the invention in which parts are by weight unless otherwise indicated:

*Example 1.*—A solution of 100 parts (1.725 M) propionaldehyde, 25 parts (0.833 M) of formaldehyde and 75 parts of water was fed continuously, over a 100 minute period, into a stirred solution of 46.4 parts (1.54 M) paraformaldehyde, 100 parts of water and 15 parts BF$_3$; 2.7 H$_2$O as the catalyst. The reaction was maintained at 100° C. by heating over a steam bath. Material which flash distilled from the reaction mixture was condensed and 30 parts of alpha-methylacrolein, 70.5 parts of propionaldehyde and 2.5 parts of methylethylacrolein, a self-condensation product of propionaldehyde, were recovered by distillation of the condensed product. The yield of alpha-methylacrolein was 84.5% (conversion 24.9%) based upon the propionaldehyde charged. Yield of alpha-methylacrolein based on formaldehyde charged was 97.5% (conversion 10%). A 10% yield of methylethylacrolein was obtained as a by-product.

*Example 2.*—Methylacrolein was prepared by a process in which propionaldehyde was gradually added to a solution of formaldehyde, water and boron trifluoride, the methylacrolein being distilled off as rapidly as formed. The solution, in which the reaction was conducted, was prepared from 100 parts of paraformaldehyde, 200 parts of water and 15 parts of boron trifluoride. This solution was heated to a temperature of about 100° C. and to it was gradually and uniformly added, over a period of approximately two hours and twenty minutes, 100 parts of propionaldehyde which was held at a temperature of about 30° C. The reaction took place substantially immediately upon the addition of the propionaldehyde to the solution and methylacrolein distilled off with water as a methylacrolein-water azeotrope substantially immediately as formed. A 74.2% yield and 29% conversion of methylacrolein was obtained based of the propionaldehyde.

The high conversions and yields realized by the process are attributable to the fact that propionaldehyde is present in the reaction mixture only in very low concentrations (which tends to inhibit side reactions), coupled with the fact that the methylacrolein substantially immediately after its formation is distilled from the reaction mixture (which prevents its decompositions), and also to the fact that such a reaction takes place with such rapidity in a mixture containing water-boron fluoride as a catalyst that this mechanism of the reaction is possible.

The versatility of alpha-methylacrolein is apparent when consideration is given to the products readily prepared therefrom. This aldehyde may be hydrogenated to isobutyroaldehyde by the addition of one molecule of hydrogen or to isobutanol by the addition of two molecules of hydrogen, the reaction being conducted by simple catalytic hydrogenation of the aldehyde. Moreover, the unsaturated aldehyde may be oxidized by any suitable process for the preparation of methacrylic acid which has valuable uses in the chemical arts, or may be polymerized or interpolymerized with other polymerizable compounds to give valuable polymers.

I claim:

1. In a process for the preparation of alpha-methylacrolein, the steps which comprise gradually adding propionaldehyde to a solution of paraformaldehyde, water and boron trifluoride, containing on a mole ratio basis from 2:1 to 3.5:1 moles of water per mole of boron trifluoride, heating said solution to a temperature between 90 and 125° C., whereby the propionaldehyde is rapidly reacted with the formaldehyde present, and distilling off the alpha-methylacrolein-water azeotrope substantially as rapidly as formed.

2. In a process for the preparation of alpha-methylacrolein, the steps which comprise cooling propionaldehyde to below room temperature, gradually adding the propionaldehyde while thus cooled to a solution of paraformaldehyde, water and boron trifluoride, there being present on a mole ratio basis from 2:1 to 3.5:1 moles of water per mole of boron trifluoride, heating said solution to a temperature between 65 and 150° C., whereby the propionaldehyde is rapidly reacted with the formaldehyde present, and distilling off the alpha-methylacrolein-water azeotrope substantially as rapidly as formed.

3. A process for the preparation of alpha-methylacrolein which comprises preparing a solution of paraformaldehyde, water and boron trifluoride, the water-boron trifluoride catalyst containing on a mole ratio basis from 2:1 to 3.5:1 moles of water per mole of boron trifluoride, heating said solution to a temperature of about 100° C., gradually adding thereto propionaldehyde which is maintained until its addition to the solution at a temperature below room temperature and distilling off the alpha-methylacrolein-water azeotrope substantially as rapidly as formed.

WILLIAM F. GRESHAM.

REFERENCES CITED

The following references are of record in the file of this patent:

UNITED STATES PATENTS

| Number | Name | Date |
| --- | --- | --- |
| 2,288,306 | Wagner | June 30, 1942 |
| 2,294,955 | Brant | Sept. 8, 1942 |
| 2,433,851 | Lieber | Jan. 6, 1948 |

FOREIGN PATENTS

| Number | Country | Date |
| --- | --- | --- |
| 513,772 | Great Britain | Oct. 20, 1939 |